US010358958B2

(12) United States Patent
Lorenz et al.

(10) Patent No.: US 10,358,958 B2
(45) Date of Patent: Jul. 23, 2019

(54) EXHAUST GAS HEAT EXCHANGER AND SEALING DEVICE FOR THE SAME

(71) Applicant: MAHLE International GmbH, Stuttgart (DE)

(72) Inventors: Goetz Lorenz, Ludwigsburg (DE); Tibor Kollet, Budapest (HU); József Mercz, Schwaebisch Gmuend (DE); László Strébl, Biatorbágy (HU); Gyula Toth, Budapest (HU)

(73) Assignee: MAHLE International GmbH, Stuttgart (DE)

( * ) Notice: Subject to any disclaimer, the term of this patent is extended or adjusted under 35 U.S.C. 154(b) by 718 days.

(21) Appl. No.: 15/008,261

(22) Filed: Jan. 27, 2016

(65) Prior Publication Data

US 2016/0194990 A1 Jul. 7, 2016

Related U.S. Application Data

(62) Division of application No. 10/549,625, filed as application No. PCT/EP2004/002803 on Mar. 18, 2004, now Pat. No. 9,279,395.

(30) Foreign Application Priority Data

Mar. 21, 2003 (DE) .................................. 103 12 788

(51) Int. Cl.
F01N 3/02 (2006.01)
F28D 7/00 (2006.01)
(Continued)

(52) U.S. Cl.
CPC ............ F01N 3/0205 (2013.01); F02M 26/12 (2016.02); F02M 26/32 (2016.02); F02M 26/36 (2016.02);
(Continued)

(58) Field of Classification Search
CPC .. F28D 7/0075; F28D 7/1607; F28D 21/0003; F28D 7/0091; F28D 7/1692;
(Continued)

(56) References Cited

U.S. PATENT DOCUMENTS 2,001,663 A     5/1935  Carlson
2,207,036 A  *  7/1940  Jacocks ................... F22D 1/006
                                                         165/75
(Continued)

FOREIGN PATENT DOCUMENTS

DE          907 899        3/1954
DE       S 54-57660 U      4/1979
(Continued)

OTHER PUBLICATIONS

Singh et al., "Mechanical Design of Heat Exchangers and Pressure Vessel Components," Arcturus Pub., Inc., Cherry Hill, NJ, pp. 12-13 (1984).

(Continued)

Primary Examiner — Keith M Raymond
Assistant Examiner — Gustavo A Hincapie Serna
(74) Attorney, Agent, or Firm — Muncy, Geissler, Olds & Lowe, P.C.

(57) ABSTRACT

An exhaust gas heat exchanger including connection points for the exhaust gas flow, for connecting the exhaust gas heat exchanger to an exhaust gas supply line for supplying a hot exhaust gas and an exhaust gas withdrawal line for withdrawing the exhaust gas flow cooled in the exhaust gas heat exchanger. The exhaust gas flow flows through the exhaust gas heat exchanger in a bundle of exhaust gas guiding pipes in a flow direction. The exhaust gas heat exchanger is provided with at least one coolant supply connection and at least one coolant withdrawal connection. Coolant is guided in a coolant channel in the exhaust gas heat exchanger, (Continued)

inside which it flows around the bundle of exhaust gas guiding pipes. The coolant channel includes at least two regions which differ in terms of the flow direction of the exhaust gas flow by divergent flow directions of the coolant.

9 Claims, 3 Drawing Sheets

(51) Int. Cl.
| | |
|---|---|
| F28D 7/16 | (2006.01) |
| F28F 9/02 | (2006.01) |
| F28F 9/22 | (2006.01) |
| F28F 9/26 | (2006.01) |
| F02M 26/12 | (2016.01) |
| F02M 26/32 | (2016.01) |
| F02M 26/36 | (2016.01) |
| F28D 21/00 | (2006.01) |

(52) U.S. Cl.
CPC ......... *F28D 7/0075* (2013.01); *F28D 7/0091* (2013.01); *F28D 7/1692* (2013.01); *F28F 9/0219* (2013.01); *F28F 9/26* (2013.01); *F28D 21/0003* (2013.01); *F28F 2009/029* (2013.01); *F28F 2009/226* (2013.01); *F28F 2265/16* (2013.01); *F28F 2265/26* (2013.01); *F28F 2265/30* (2013.01); *F28F 2275/20* (2013.01); *Y02T 10/121* (2013.01); *Y02T 10/16* (2013.01); *Y10T 403/18* (2015.01)

(58) Field of Classification Search
CPC .. F28F 9/0219; F28F 9/26; F28F 9/266; F28F 2009/029; F28F 2009/226; F28F 2265/16; F28F 2265/26; F28F 2265/30; F28F 2275/00; F28F 2275/20; F02M 26/12; F02M 26/32; F02M 26/36; F01N 3/0205; Y02T 10/16; Y02T 10/121; Y10T 403/18
USPC .......................................... 165/157; 277/597
See application file for complete search history.

(56) References Cited

U.S. PATENT DOCUMENTS

| | | | | |
|---|---|---|---|---|
| 2,226,494 | A * | 12/1940 | Jacocks | F28F 9/0202 165/75 |
| 2,235,669 | A * | 3/1941 | Conklin | H01J 19/36 165/74 |
| 2,254,189 | A * | 8/1941 | Reed | F28F 9/0239 165/157 |
| 2,268,507 | A * | 12/1941 | Gertzon | F22D 1/32 165/158 |
| 2,595,822 | A | 5/1952 | Uggerby | |
| 2,857,142 | A * | 10/1958 | Gertzon | F28F 9/0202 165/158 |
| 3,121,559 | A | 2/1964 | Tippmann | |
| 3,228,456 | A * | 1/1966 | Brown | F22B 1/08 165/134.1 |
| 3,244,225 | A * | 4/1966 | Nevins | F28D 7/06 122/32 |
| 3,280,905 | A | 10/1966 | Costes | |
| 3,398,787 | A | 8/1968 | Bevevino | |
| 3,794,118 | A * | 2/1974 | Bauch | B29C 55/04 165/90 |
| 3,871,445 | A | 3/1975 | Wanka et al. | |
| 3,948,315 | A * | 4/1976 | Powell | F28D 7/06 165/70 |
| 4,252,186 | A | 2/1981 | Starner et al. | |
| 4,539,940 | A | 9/1985 | Young | |
| 4,564,065 | A | 1/1986 | Roberts | |
| 4,696,339 | A * | 9/1987 | Schwarz | F01M 1/10 123/41.33 |
| 4,733,722 | A | 3/1988 | Forbes et al. | |
| 5,236,043 | A * | 8/1993 | Armbruster | F01M 5/002 137/855 |
| 5,653,282 | A | 8/1997 | Hackemesser et al. | |
| 5,848,036 | A * | 12/1998 | Ishibashi | G11B 7/0945 369/44.29 |
| 6,209,624 | B1 | 4/2001 | Cameron | |
| 6,321,835 | B1 | 11/2001 | Damsohn et al. | |
| 6,640,579 | B2 | 11/2003 | Matsushima et al. | |
| 6,672,377 | B2 * | 1/2004 | Liu | F28D 7/106 165/154 |
| 2003/0111209 | A1 | 6/2003 | Tsujita et al. | |
| 2003/0111210 | A1 | 6/2003 | Tsujita et al. | |

FOREIGN PATENT DOCUMENTS

| | | |
|---|---|---|
| DE | 41 23 243 A1 | 1/1993 |
| DE | 296 22 411 U1 | 2/1997 |
| DE | 196 54 368 A1 | 6/1998 |
| DE | 101 57 285 A1 | 6/2003 |
| EP | 0 205 205 A1 | 12/1986 |
| EP | 0 823 016 B1 | 7/2000 |
| EP | 1 091 113 A2 | 4/2001 |
| JP | S 55-69293 U | 5/1980 |
| JP | S 57-117787 A | 7/1982 |
| JP | 10-306987 A | 11/1998 |
| JP | 2000-045883 A | 2/2000 |
| JP | 2001-074380 A | 3/2001 |
| JP | 2001-289583 A | 10/2001 |
| JP | 2002-004952 A | 1/2002 |
| WO | WO 03/064953 A1 | 8/2009 |

OTHER PUBLICATIONS

German Search Report for German Application No. 103 12 788.7 dated Mar. 21, 2003.
"Standards of Tubular Exchanger Manufacturers Association", Eighth Edition (1999).

* cited by examiner

EXHAUST GAS HEAT EXCHANGER AND SEALING DEVICE FOR THE SAME

The present invention relates to exhaust gas heat exchangers, as are known in general, and to a sealing device which is suitable particularly for use in the case of exhaust gas heat exchangers.

Exhaust gas heat exchangers are used in exhaust gas recirculation systems in particular for increasing the mass of combusted air taken in during an intake stroke. For this purpose, the density of the recirculating exhaust gas flow has to be increased, which takes place by means of cooling of the recirculated gas flow. This usually takes place by the exhaust gas flow flowing through an exhaust gas heat exchanger where it outputs heat to a coolant, such as a cooling liquid.

Exhaust gas heat exchangers are therefore known, through which both an exhaust gas flow and a coolant flow flow. The exhaust gas heat exchanger has for the exhaust gas flow connection points for connecting the heat exchanger, with, firstly, an exhaust gas supply line being provided for supplying the hot exhaust gas flow, and an exhaust gas withdrawal line being provided for withdrawing the exhaust gas flow cooled in the exhaust gas heat exchanger. In this case, the exhaust gas flow flows in a throughflow direction through the exhaust gas heat exchanger in a bundle of exhaust gas guiding tubes. The bundle of exhaust gas guiding tubes serves essentially to enlarge the exchange surface between the exhaust gas flow and the coolant flow. At least one coolant supply connection and at least one coolant withdrawal connection are provided for the throughflow of the coolant flow through the exhaust gas heat exchanger. The coolant is guided here in a coolant channel within which it flows around the bundle of exhaust gas guiding tubes.

In the case of exhaust gas heat exchangers of this type, the coolant flow is either guided through the exhaust gas heat exchanger in parallel with and in the direction of the exhaust gas flow or else is guided through the exhaust gas heat exchanger counter to the throughflow direction of the exhaust gas flow.

The selection of the throughflow direction of the coolant flowing with respect to the exhaust gas flow is dependent here firstly on structural conditions, for example the option of permitting the linear compensation for the thermal expansion of the parts conducting exhaust gas through the exhaust gas heat exchanger and secondly in respect of optimizing the heat output of the exhaust gas flow in the heat exchanger. In this case, the optimization is undertaken to the effect that the exhaust gas flow is to output as large a quantity of heat as possible to the coolant.

Furthermore, vibration problems frequently also occur in the case of exhaust gas heat exchangers. The excitations to vibration that are initiated in the driving mode of a vehicle and during operation of the internal combustion engine are also transmitted to the exhaust gas heat exchanger and, for example via the exhaust gas flow, excitations to vibration are also transmitted directly to the parts conducting the exhaust gas flow. In this case, in particular the exhaust gas guiding tubes have a tendency to vibrate, since they generally span a free length which is as long as possible and can vibrate in this region. It is therefore the object of the invention to optimize the design of an exhaust gas heat exchanger to the effect that the disadvantages can be compensated for and, at the same time, the quantity of heat output can be optimized. This object is achieved according to the invention by an exhaust gas heat exchanger according to claim 1.

A further technical problem which occurs in conjunction with exhaust gas heat exchangers is the fluidtight guiding of the exhaust-gas-conducting connection points out of the exhaust gas heat exchanger. Due to the changing thermal load, this guiding of them out has to be able to compensate for an expansion play of the exhaust-gas-conducting parts. On the other hand, it is necessary for the tightness to continue to be ensured in this region. A particularly favorable design of a sealing device of this type can be gathered from the further independent claim. In this case, a sealing device of this type can also be used in the case of other component leadthroughs, which are to be designed in a fluidtight manner, out of another component which is thermally more heavily or less heavily loaded.

An exhaust gas heat exchanger designed according to the invention has an exhaust gas flow and a coolant flow flowing through it. The exhaust gas heat exchanger has for the exhaust gas flow connection points for connecting the exhaust gas heat exchanger both to an exhaust gas supply line for supplying a hot exhaust gas flow and an exhaust gas withdrawal line for withdrawing the exhaust gas flow cooled in the exhaust gas heat exchanger. The exhaust gas flow here flows in a throughflow direction through the exhaust gas heat exchanger in a bundle of exhaust gas guiding tubes. Furthermore, a coolant flows in a coolant flow through the exhaust gas heat exchanger. For this purpose, at least one coolant supply connection and at least one coolant withdrawal connection are provided. In the exhaust gas heat exchanger, the coolant is guided in a coolant channel within which it flows around the bundle of exhaust gas guiding tubes. According to the invention, the coolant channel has at least two regions which differ in terms of the throughflow direction of the exhaust gas flow by diverging throughflow directions of the coolant.

By means of the division of the coolant channel into two regions through which the flow flows in different directions, the transmission of heat from the exhaust gas flow to the coolant flow can be improved by the fact that the difference in temperature between exhaust gas flow and coolant flow is increased by a section twice being available at which coolant having the starting temperature is supplied and this not being in contact with the exhaust gas flow over the entire length of the exhaust gas heat exchanger.

In this connection, according to an advantageous refinement of the invention, each of the regions is assigned at least one coolant channel segment, with a coolant channel segment being fluidically connected in each case to the coolant supply connection and to the coolant withdrawal connection. The division into coolant channel segments and its respective fluidic connection with coolant supply connection and coolant withdrawal connection permits a simple division of the coolant channel into subsections having a different throughflow direction.

According to an advantageous refinement, at least one region of the coolant channel has the flow flowing through it in the throughflow direction of the exhaust gas flow. A throughflow in the same direction of exhaust gas flow and coolant flow permits a relatively long contact time between the coolant flowing through and the exhaust gas flowing through. By this means, in particular if the difference in temperature between exhaust gas and coolant is very large, a very favorable transfer of energy from the exhaust gas flow to the coolant flow is made possible. According to a further advantageous refinement, there is at least one region in which the coolant flow flows through counter to the throughflow direction of the exhaust gas flow. By means of this measure, a difference in temperature which is as constant as possible between exhaust gas flow and coolant flow is maintained over the entire length of the region. This measure also serves to optimize the transfer of energy from the exhaust gas flow to the coolant flow. A direction of flow of the coolant flow transverse to the exhaust gas flow is also possible.

According to a preferred refinement of the invention, a region of the coolant channel which has the flow flowing through it counter to the throughflow direction of the exhaust gas flow is formed on the approach-flow side of the exhaust gas guiding tubes and preferably a region of the coolant channel which has the flow flowing through it in the throughflow direction of the exhaust gas flow is formed on the discharge-flow side of the exhaust gas guiding tubes.

According to an alternative refinement, it is provided that a region of the coolant channel which has the flow flowing through it counter to the throughflow direction of the exhaust gas flow is formed on the approach-flow side of the exhaust gas guiding tubes and preferably a region of the coolant channel which has the flow flowing through it in the throughflow direction of the exhaust gas flow is formed on the discharge-flow side of the exhaust gas guiding tubes.

A further refinement of the invention makes provision for the at least two regions to have a fixed length ratio. According to a first advantageous refinement, the length ratio is determined as a function of the thermal coefficient of expansion of the material used for producing the exhaust gas guiding tubes. The length ratio is preferably selected in such a manner that a fixed relationship is observed in the thermal linear expansion of the two regions, the fixed relationship residing in particular in a length ratio, which is constant irrespective of temperature, of preferably one. The effect achieved by this measure is that the two different regions through which the flow flows have a constant length ratio irrespective of the temperature of each other. This measure leads in particular to the thermal expansion behavior of the exhaust gas heat exchanger being favorably influenced.

Another advantageous refinement makes provision for the length ratio to be determined in such a manner that in each of the two regions a predetermined portion of the heat energy output overall by the exhaust gas flow is output. Provision may be made here in particular for a small portion of the quantity of heat output overall to be output, for example, to the region through which the exhaust gas flow first of all flows, with more than 70%, in particular between 80 and 95%, of the quantity of heat output overall being output, for example, in one of the two regions. According to such a refinement of the invention, an exhaust gas heat exchanger is therefore provided by a small quantity of heat being output in a first region, which is preferably kept short, while the main part of the quantity of heat is exchanged in a subsequent, long section. This measure makes it possible to distribute the exchange of energy to two regions, with each of the regions being optimized in its function. In particular, by means of a design of this type, an overall relatively large transfer of energy from the exhaust gas flow to the coolant can therefore be transferred in an advantageous manner.

According to an advantageous refinement of the invention, the exhaust gas guiding tubes are designed in such a manner that a turbulent exhaust gas flow is formed in their interior. The measure of providing a turbulent exhaust gas flow increases the residence time of the exhaust gas in the exhaust gas guiding tube and therefore optimizes the heat exchange within the exhaust gas heat exchanger.

An exhaust gas heat exchanger designed according to the invention, which may also involve a development of the abovementioned refinements, makes provision for the exhaust gas heat exchanger to have at least one tube body which is formed from a bundle of exhaust gas guiding tubes which are aligned parallel to one another. In this case, the ends of the exhaust gas guiding tubes are in each case fixed on a common tube plate. They rest here in each case in an opening in the respective tube plate and close this opening in a fluidtight manner. All of the openings in the tube plate are assigned in each case to one exhaust gas guiding tube. The construction of a tube body in this way can be produced in a simple manner. In addition, the tube body is fixed on account of this manner of construction and is less susceptible to vibrations.

According to an advantageous refinement, provision is made, in the case of at least one of the tube plates, for a bell-shaped exhaust gas collector to be arranged on that side of the tube body which faces away from the bundle of tubes, said collector having a connection point and being connected in a fluidtight manner to the tube plate. The bell-shaped exhaust gas collector constitutes a simple means of providing a transition between a connection point and the tube body, with a distribution of the exhaust gas flow to the individual exhaust gas guiding tubes of the tube body or a collection of the partial flows after they have flowed through the exhaust gas guiding tubes being made possible.

According to a further advantageous refinement, the exhaust gas heat exchanger has two tube bodies, with two tube plates of the tube bodies facing each other—in particular directly butting against each other, the exhaust gas guiding tubes preferably being aligned flush with one another—and with said tube plates being connected to each other toward the outside in a fluidtight manner. The division of the exhaust-gas conducting means into two tube bodies makes it possible to displace the vibration behavior of the exhaust gas guiding tubes in the exhaust gas heat exchanger in the direction of higher natural vibration frequencies. This advantageously results in the service life of the exhaust gas heat exchanger being increased. The natural vibration frequencies are displaced into a region in which there are fewer excitations to vibration. This resides in the shortening of the free length of the exhaust gas guiding tubes. As a result, both the vibration behavior and a possible development of noise by the exhaust gas heat exchanger are reduced.

According to a preferred refinement, provision is made here for a respective bell-shaped exhaust gas collector to be arranged at both free ends of two tube bodies connected to each other, said collectors in each case having a connection point and being connected to the bundle of tubes in a fluidtight manner. In this case, provision is made in particular for the coolant channel of the exhaust gas heat exchanger to extend over the length between the two bell-shaped exhaust gas collectors and optionally also to partially enclose them. A respective sealing device is formed in this case between the bell-shaped exhaust gas collectors and a coolant housing which bounds the coolant channel and radially surrounds the tube bodies. According to a further preferred advantageous refinement of the coolant guiding housing, the latter is composed of two half shells which are added together to form a housing which is closed to the outside. The half shells have, on the one hand, two connections which are formed on the end-side of the half shells. One of the half shells has a further connection point in particular in the region of a widening of the outside diameter of the half shells, the connection point serving for the supply and the withdrawal of coolants.

The coolant is in particular cooling water which has been branched off from the cooling circuit of the internal combustion engine and is subsequently supplied to said cooling circuit again. In this case, it is possible in particular for the cooling liquid then to be supplied to a further heat exchanger, in particular to the heat exchanger for producing a flow of warm air for a heating system of the vehicle. Instead of water, the coolant may also be another fluid, for example air which is flowing through. Although the use of air reduces the thermal capacity of the coolant in comparison to other coolants, for example water, the heated air produced in this case can be used directly at another location, for example for defrosting vehicle windows or the like. Of course, the coolant flow in this case may also be used directly for heating the interior of the vehicle.

According to a method according to the invention for producing an exhaust gas heat exchanger, first of all the tube bodies are produced. If required, the two tube bodies are connected to each other in a fluidtight manner. The bell-shaped exhaust gas collectors are subsequently fastened to the free ends of the tube bodies and in particular are connected to the tube plates in a fluidtight manner. The tube body, optionally further supported in the region of the exhaust gas guiding tubes by intermediate webs, is inserted into a lower half shell. The sealing devices are fastened to the bell-shaped exhaust gas collectors. They are connected to the lower half shell of the coolant guiding housing in a fluidtight manner. The upper half shell is then placed onto the lower half shell. A fluidtight connection is produced in the region of the sealing device and via the abutting edge of the two half shells against each other.

A particularly favorable method for producing two tube bodies, the exhaust gas guiding tubes of which are aligned flush with one another, resides in two tube plates which are arranged tightly next to each other being pushed on to a corresponding number of gas guiding tubes having, as seen continuously, the entire length of the pair of tube bodies. In this case, a connection may already be produced between the tube plates and the individual exhaust gas guiding tubes. The connection may be produced, for example, by shrinking on, by corresponding adhesive bonding or else by welding. Before or after the production of the connection between the individual exhaust gas guiding tubes and the tube body, a severing of the bundle of the exhaust gas guiding tubes takes place in a gap between the two tube plates. Before this severing takes place, the outer tube plates may also be pushed onto the bundle of exhaust gas guiding tubes. The severing takes place in particular by laser cutting or a comparable process. According to a preferred refinement, the severing may take place in each case flush with the surface of the two tube plates. If a further working step then has to be carried out in order to fasten the exhaust gas guiding tubes to the tube plates, then this is carried out now. The two tube plates can subsequently be connected to each other in a fluidtight manner, which can take place in particular by them being adhesively bonded or welded to each other along their abutting surfaces, with it being possible for the weld seam to follow the outer contour of the tube plates. However, it is also possible, via an encircling crimping or clamping, to produce an additional or sole fastening of the tube plates to each other. Following this, a respective tube plate may also be fastened to the free ends of the exhaust gas guiding tubes, if this has not yet happened. The bell-shaped gas collectors are welded onto the tube plates.

A sealing device designed according to the invention for an exhaust gas heat exchanger or another fluidtight lead-through between two components, namely an exhaust-gas-conducting hot component and a cold component which outwardly bounds a cooling device, serves to lead the hot component through to the outside through the cold component. In this case, the hot component is held in the cold component in a manner such that it can be displaced longitudinally with axial guidance. According to the invention, the sealing device has two sealing elements which are independent of each other. Each of the sealing elements produces a fluidtight connection between hot component and cold component.

The provision of a double seal, with two sealing devices completely independent of each other, increases the service life and the security of the sealing device in particular in the case of applications exposed to high thermal loads. In this case, care has to be taken to ensure that the sealing device, on the one hand, is indeed arranged in the region of the component cooled by the cooling liquid, but, on the other hand, can be entirely exposed to the high temperatures of the hot component.

According to a preferred refinement of the invention, an intermediate chamber which is closed in a fluidtight manner is formed between the two sealing elements of the sealing device. This intermediate chamber permits the seals to be separated spatially from each other and at the same time to form an insulating gap between the two seals. Furthermore, the penetration of one of the two media, i.e. of the exhaust gas flow or of the coolant flow, into the intermediate chamber between the two sealing devices can constitute an indication of a corresponding leakage and can be monitored.

According to a preferred refinement of the invention, at least one bore passing through the cold component and leading to the outside is fitted into the sealing device in the region between the two sealing elements, the at least one bore having a thread in particular over a partial length. The provision of corresponding bores which may lead in particular into the intermediate chamber results in it being possible in a simple manner firstly to check the seal tightness of the sealing devices during production and secondly also to monitor the occurrence of leakages of the sealing devices. It is possible in particular to establish whether the first, inner sealing element of the sealing device still forms a sealing closure in relation to the seal situated between the hot component and the cold component. Medium can only penetrate from this chamber into the intermediate space between the two sealing elements if the inner seal is untight. This would be made noticeable by the escape of medium, for example a coolant, flowing through the chamber. This would escape in this case at the at least one bore and would be detectable there. According to a preferred refinement of the invention, the sealing device has more than one, in particular two or three such bores. The bores are suitable in particular for the connection of a burst-testing device for carrying out a tightness check. A method for carrying out a tightness check before a device having a sealing device designed in such a manner is used involves the bores being closed, in particular involves line endings being screwed into the bores. A pressurized fluid, for example compressed air, is then supplied via at least one of the lines. It is checked via a pressure measuring device connected to another bore whether the pressure provided can be maintained constantly in the intermediate space over a predetermined time without pressurized fluid being fed in. After appropriate venting, the burst-testing device can then be removed again. If a leakage occurs, then it can be checked, for example by measuring the pressure at the connection points of the chamber of an exhaust gas heat exchanger designed according to the invention, whether the leakage takes place into the chamber. This can be established with, for example, a rise in pressure in the chamber. It is therefore not only possible by means of the burst-testing process to establish leakages, but also to classify which of the two sealing elements is not fully sealing. The tightness of the coolant channels may also be checked by such a burst-testing process.

It is in keeping with advantageous refinements if at least one of the two sealing elements is a radial seal or if at least one of the two sealing elements is an axial seal. The terms radial seal and axial seal have been selected in such a manner that a radial seal refers to a seal in which the sealing means extends in the radial direction from one sealing surface to the other sealing surface and seals off an intermediate space. An axial seal extends along an axis and seals off a gap which is correspondingly aligned. Therefore, in the case of the radial seal, the throughflow direction of a leakage is aligned axially while this runs radially in the case of an axial seal. As radial seal, use can be made in particular of sealing rings of polymer compounds or with metal while the axial seal can be designed, for example, as a bellow seal, in which a bellows, which is folded in the manner of a concertina and forms a ring, is connected in a fluidtight manner by its axial ends in each case to one component of the components which are to be sealed off in relation to one another.

A tightness test during the use of the sealing device, for example during the operation of a vehicle, and the use of the sealing device in an exhaust gas heat exchanger takes place, for example, in such a manner that the escape of coolant as a bore is checked. Instead of a visual check, it is also possible, of course, for a sensory test to be carried out via a moisture sensor arranged there. For this purpose, it is in keeping with an advantageous refinement of the invention if the at least one bore is arranged in the region of the installation position at the lowest point of the sealing device.

It is in keeping with a particularly advantageous refinement if the sealing device has an axial seal and a radial seal, with the two seals being spaced apart from each other, so that an intermediate chamber is formed in particular between the two sealing elements. In this case, in particular the axial seal is the inner seal sealing off the two parts from each other during operation, while the radial seal is in particular the back up seal for the situation in which the axial seal has leakages.

The use of an axial seal in conjunction with a leadthrough in the case of a sealing device according to the invention has the advantage in particular that said axial seal is suitable for being able more easily to compensate for length plays between components movable with respect to one another, which length plays occur, for example, due to changes in temperature, than is the case in the case of a radial seal which has to be able to slide here along a sealing surface, so that an axial stroke of the two parts which are sealed off in relation to each other can be compensated for. The use of two different sealing elements also has the advantage that, in the case of loads which occur and over the load cycles, different strengths complement each other.

The invention is furthermore explained in more detail below with reference to the exemplary embodiment which is illustrated in the drawing, in which.

Figure 1:
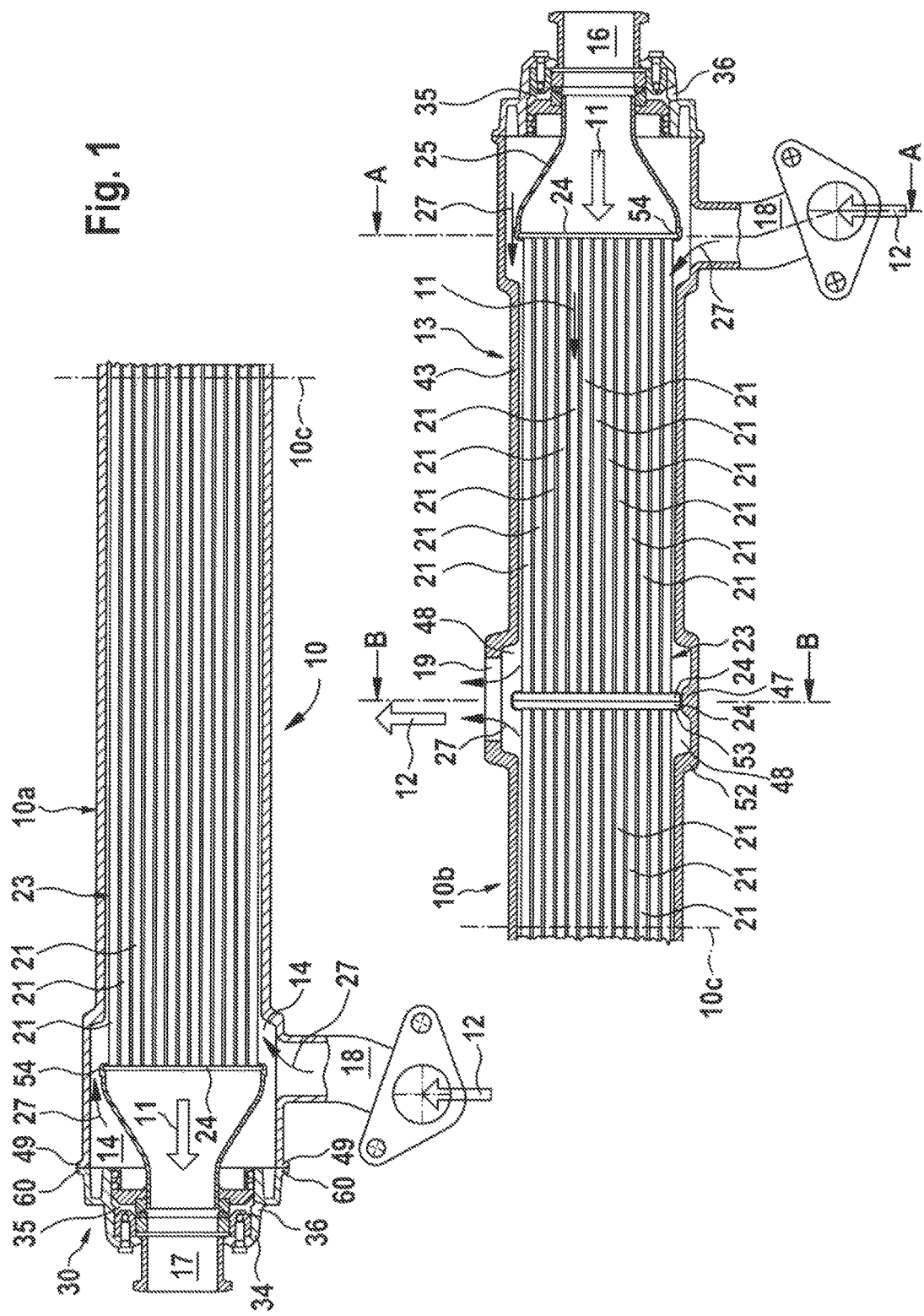
FIG. 1 shows the sectional illustration through an exhaust gas heat exchanger according to the invention.
Figure 2:
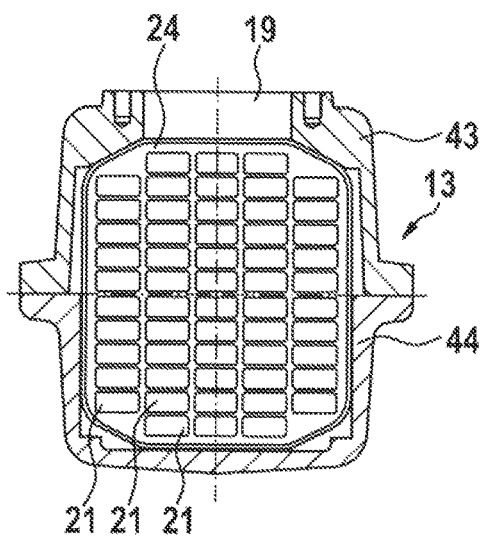
FIG. 2 shows the section with reference to the section line B-B through FIG. 1 in the region of the central connection.
Figure 3:
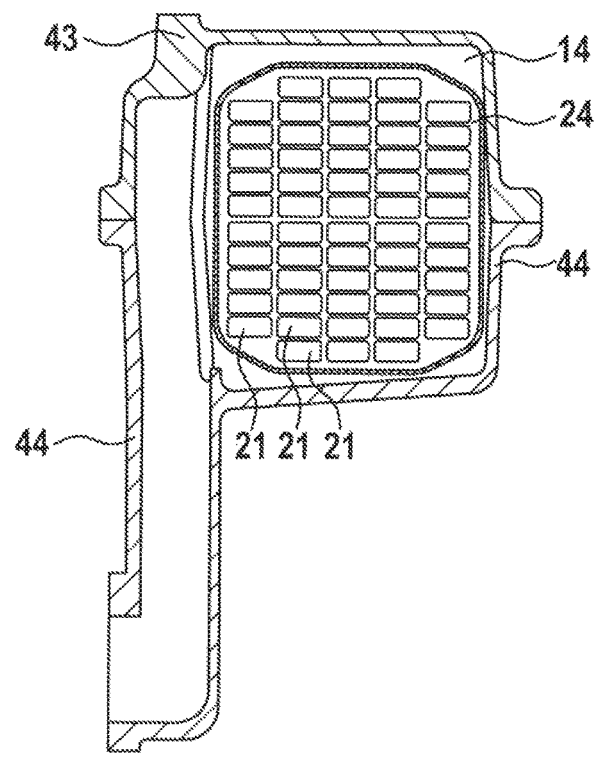
FIG. 3 shows the section according to the section line A-A through FIG. 1.
Figure 4:
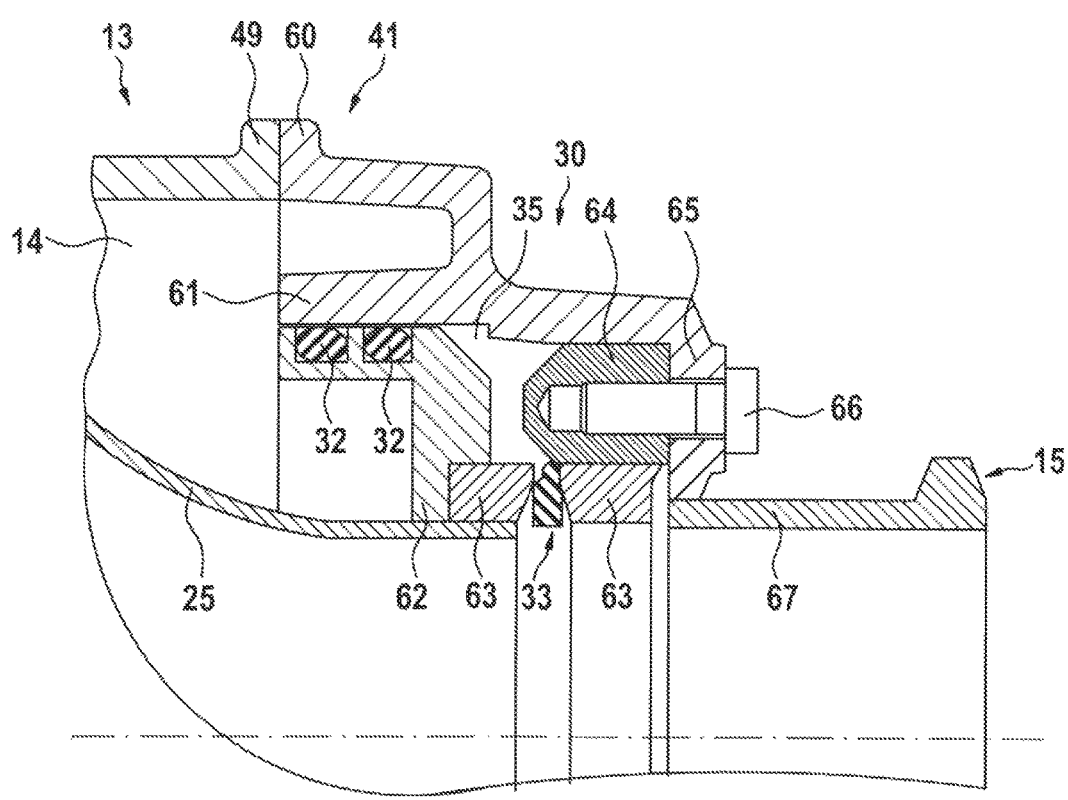
FIG. 4 shows the enlarged illustration of a detail of a sealing device according to the invention.

FIG. 1 shows, in a sectional illustration, an exhaust gas heat exchanger 10 designed according to the invention. In the illustration of FIG. 1, the exhaust gas heat exchanger 10 has been divided into two parts 10*a* and 10*b*, with the division having taken place along the dividing line 10*c* (illustrated by chain-dotted lines), so that the illustration of the heat exchanger, which is of linear design per se, can be undertaken on an enlarged scale without having to reproduce the proportions of the two tube bodies 23 in a changed manner. FIGS. 2 and 3 show sectional illustrations along the section lines A-A and B-B illustrated in FIG. 1. FIG. 4 shows an enlarged illustration of a detail in the region of a sealing device, as also illustrated in FIG. 1.

An exhaust gas heat exchanger 10 according to the invention, as illustrated in FIGS. 1 to 4, is described below with reference to a method for producing an exhaust gas heat exchanger of this type.

First of all, a number of exhaust gas guiding tubes 21, which may in particular be rectangular semi-finished products which can be cut to length, are aligned in a suitable number parallel to one another in accordance with the requirements of the invention. For this purpose, first of all the semi-finished products are cut to a length which corresponds approximately to the overall length of the section formed by the exhaust gas guiding tubes 21 in the exhaust gas heat exchanger. The two tube plates 24, which are connected to each other at a later time, are then pushed, slightly spaced apart from each other, onto the exhaust gas guiding tubes 21. In the process, these tube plates 24 are positioned on the exhaust gas guiding tubes 21 in such a manner that the two outwardly emerging, free lengths of the semi-finished product are in accordance with the desired ratio between the lengths of the exhaust gas guiding tubes of the two tube bodies 23. The end-side tube plates 24 are also pushed onto the exhaust gas guiding tubes 21. A respective exhaust gas guiding tube rests here in each opening in the tube plate that is intended for receiving an exhaust gas guiding tube. Like the two tube plates 24 pushed on first of all, the end-side tube plates can be connected to the exhaust gas guiding tubes 21 by being shrunk on. If desired or required, the end-side tube plates 24 may alternatively or additionally be welded to the exhaust gas guiding tubes 21 in order to produce a fluidtight connection to the same. A severing of the semi-finished products protruding through the central tube plates then takes place, with it being possible for this severing to be carried out, for example, by laser cutting. The severing takes place in each case flush with the surface of the mutually facing sides of the two tube plates 24. Subsequently, if this is still required, the exhaust gas guiding tubes 21 are connected in a fluidtight manner to the two otherwise mutually facing tube plates 24, for example by a corresponding welding process, with it also being possible for laser welding processes to be used here. In this manner, two tube bodies 23 which form a pair are formed in a simple manner from the semi-finished products.

The mutually facing, inner tube plates 24 are connected to one another in a fluidtight manner in the next working step, which takes place, for example, by them being welded together along their side edge, with care being taken to ensure the formation of a fluidtight, continuous welding seam. The welding can take place by laser welding or by roll spot welding or another welding process. In order to form a defined outer contour of the two tube plates, the latter can also be engaged around by an encircling ring clip 53 which is in particular also tightly welded onto it.

Respective bell-shaped exhaust gas collectors 25 are then welded in a fluidtight manner on the outer tube plates 24, on the side facing away from the exhaust gas guiding tubes 21. In this case too, an annular clip 54 can form the outer contour in the region of the attachment point between tube plate 24 and bell-shaped exhaust gas collector. Also, in particular welding processes with a weld seam running continuously are suitable as a fastening possibility for the fastening of the bell-shaped exhaust gas connectors.

The first of two tube bodies 23, which are closed on both sides by bell-shaped exhaust gas collectors 25, is then inserted into a lower half shell 44. The lower half shell forms part of the coolant guiding housing 13 and in the region of its profile delimits the chamber in the interior of the coolant guiding housing outward. In the process, the constructional unit is held in the region of the two tube plates 24 which are welded to each other, i.e. not on the edge side in the region of extent of the constructional unit. The lower half shell 44 has a radial widening 52 which extends axially on both sides of the two tube plates 24. In the region of the radial widening 52, a bearing ring 47 is formed, said bearing ring radially surrounding the ring clip 53 and this forming a fixed mount for the constructional unit. By means of the bearing of the ring clip 53 against the bearing ring 47, the path of fluid is prevented in the axial direction by the chamber 14. An annular chamber 48 is formed on both sides of the bearing ring 47, only in the region of the radial widening 52, said annular chamber opening at one point into a connection point 19, here a coolant withdrawal connection 19, which is fluidically connected to both sides which are separated from each other by the tube plates 24. In the exemplary embodiment illustrated, the coolant withdrawal connection 19, however, is arranged in the upper half shell 43 which is placed on later.

After the constructional unit is inserted into the lower half shell 44, the sealing unit 30 is fitted. The sealing unit 30 contains a basic body which is of essentially rotationally symmetrical design. The basic body ends in an insert flange 60 which can be placed against a corresponding bearing flange 49 of the upper half shell 43 and the lower half shell 44. The flanges 49 and 60 are connected to each other in a fluidtight manner by welding, for example. Offset radially inward, the basic body 34 has a bearing sleeve 61 which, as seen axially, projects into the region of the bell-shaped exhaust gas collector 25. In this region, the bearing sleeve 61 is of cylindrical design, i.e. is of rotationally symmetrical design with a constant diameter, as seen in the axial direction. Before the basic body 34 is placed on, an intermediate ring 62 is welded onto the bell-shaped exhaust gas collector 25 and surrounds the outer connectors of the bell-shaped exhaust gas collector radially in a fluidtight manner. The bellows seal 33 is pushed onto this intermediate ring 62 axially, said bellows seal having as fastening points a respective annular body 63 at its axial ends, between which the bellows of the bellows seal 33 extends and onto which said bellows is fastened in each case in a fluidtight manner. One of the two annular bodies 63 is welded in a fluidtight manner to the intermediate ring 62. The other annular body 63 has an outer ring 64 which can accommodate drill holes which are preferably designed as a blind hole. In this case, the outside diameter of the outer ring 64 corresponds approximately to the outside diameter of the intermediate ring 62, but is spaced apart axially from the latter, this axial spacing forming the intermediate chamber 35. A pair of O-rings is arranged radially on the outside of the intermediate ring 62, as a radial seal 32 on the circumferential surface. After intermediate ring 62 and axial seal 33 are fastened to the bell-shaped exhaust gas collector 25, the basic body 34 is pushed in the axial direction over the bell-shaped exhaust gas collectors 25 in such a manner that the radial seal 32 of the intermediate ring 62 passes into sealing contact with the inner cylindrical surface of the bearing sleeve 61.

Situated further on the outside in the axial direction, the outer ring 64 of the axial seal 33 is radially surrounded by the bearing sleeve 61, with it being possible for the outer contours to have a conical design matched to one another, said conical designs tapering axially outward. The bearing sleeve 61 merges into a sleeve surface 65 which has bores positioned corresponding to the bores in the outer ring 64 and via which a screw fastening with fastening screws 66 can take place, with a fluidtight end being achieved via the in particular form-fitting bearing of the outer ring 64 against the sleeve surface 65 in the cylindrical to conical inner surface of the bearing sleeve 61. In this case, the sleeve surface 65 opens up an opening into which a connecting flange 67 is inserted, said connecting flange being designed as a sleeve and the free inside diameter of which, through which the flow can flow, corresponds to the diameter of the bell-shaped exhaust gas collector in its inflow region. That inner region of the bell-shaped exhaust gas collector through which the exhaust gas flows is separated from the chamber 14 in the interior of the coolant guiding housing 13 via the axial seal 33 and the radial seal 32. Owing to the fact that the axial seal 33 has axial movability in the axial direction via the convolution of its bellows and the intermediate ring 62 can slide in the axial direction in the bearing housing 61, an axial compensation of the thermal expansion of the two tube bodies 23 is possible. The leadthrough of the exhaust gas supply line 16 or of the exhaust gas withdrawal line 17 through the exhaust gas heat exchanger is therefore a loose bearing, as seen in the axial direction. Only in the region of the bearing ring 47 is a positionally fixed mounting of the tube bodies 23 and therefore of all of the hot components out of the cold components provided.

In this case, the hot component 40 is the bell-shaped exhaust gas collector 25 and the connecting flange 67 forming a connection point 15. The cold component 41 is formed by the upper and lower half shells 43, 44 and by the basic body 34 of the sealing device 30.

Bores 36 are guided through the basic body 34 into the intermediate chamber 35 which is bounded in the axial direction by the intermediate ring 62 and the annular body 63 or the ring 64 and radially by the axial seal and the bearing sleeve 61. If the radial seal 32, which is formed here from two O-rings independent of each other, has a leakage, then liquid flows out of the chamber 14 into the intermediate chamber 35 due to this leakage. In the interior of the intermediate chamber 35, this liquid then flows to the lowest point by a bore 36 being provided in each case. The escape of liquid from this bore enables the presence of a leakage to be established, but an overflow of the escaping cooling liquid, for example cooling water, into the part conducting exhaust gas is not possible owing to the presence of the axial seal 33.

The connection points for the coolant supply connection 18 are also formed in the lower half shell 44. These connection points are formed in a region of the lower half shell 44 by the latter also surrounding part of the bell-shaped exhaust gas collector 25, so that the chamber 14 formed in the interior of the coolant guiding housing 13 which forms is situated and is therefore in contact with the influence of the coolant.

In the next working step, the upper half shell 43 is placed onto the lower half shell 44 and the half shells are welded and screwed to each other in a fluidtight manner. In this case, the upper half shell also has a bearing flange 49. The basic body 34 is connected to the sealing device 30 in a fluidtight manner, i.e. in particular is welded thereto. It is also possible to provide screw bores in the direction of extent of the tube bodies 23, by means of which the two half shells can be connected to each other, with it also being possible to provide a seal in order to obtain a fluidtight casing. It is possible to hold the bearing flange 60 in a fluidtight manner on the bearing flange 49 by a screw connection, with it also being possible for sealing means, such as O-rings, to be used here as sealing means.

The exhaust gas heat exchanger 10 illustrated in FIG. 1 has an exhaust gas flow flowing through it, illustrated diagrammatically by the arrows 11. The exhaust gas supply line 16 supplies the exhaust gas flow which then flows into a bell-shaped exhaust gas collector 25 which acts as a diffuser and distributes the exhaust gas flow to the individual exhaust gas guiding tubes 21 of the tube bodies 23. After flowing through the tube bodies, the exhaust gas flow 11 is collected in the second bell-shaped exhaust gas collector 25 and leaves the exhaust gas heat exchanger 10 in the exhaust withdrawal line 17.

The exhaust gas heat exchanger has a cooling liquid, such as water, flowing through it as coolant. The coolant flow is illustrated by the arrows 12. Two coolant flows form in the exhaust gas heat exchanger. The coolant is supplied through the two coolant supply connections 18 formed in the region of the bell-shaped exhaust gas collectors 25. It flows in each case from the coolant supply connection 18 to the coolant withdrawal connection 19 formed in the region in which the two bundles of tubes 25 meet. From the coolant supply connection 18, which is formed on the supply side of the exhaust gas flow, i.e. in the region of the exhaust gas supply line 16, the coolant flows parallel to the exhaust gas flow flowing through the exhaust gas guiding tubes 21, to the coolant withdrawal connection 19. This is the shorter region in the embodiment illustrated, the length of which is approximately half the size of the longer of the two regions. In this case, the coolant flow is guided in the chamber 14, which is bounded by the coolant guiding housing 13, and flows around the exhaust gas guiding tubes 21 on all sides, so that a good flow of heat from the exhaust gas flow to the coolant flow is ensured. The coolant flow, which flows through the exhaust gas heat exchanger in the opposite direction to the direction of flow through the tube bodies 23, flows from the coolant supply connection 18—which is formed in the region of the bell-shaped exhaust gas collector 25 opening into the exhaust gas withdrawal line—to the annular chamber 48 and likewise passes into the coolant withdrawal connection 19 where it leaves the exhaust gas heat exchanger 10.

During the flow through the exhaust gas heat exchanger, the exhaust gas flowing through is cooled while the coolant is heated. The exchange of thermal energy is facilitated by a surface area which is as large as possible and in which a contact between a separating surface, which has as thin a wall as possible, the exhaust gas flow is thermally conductively in contact with the coolant flow.

In this case, a process according to the invention, for cooling an exhaust gas flow, is complied with if the direction in which the coolant flows past the exhaust gas flow is divided into two regions, with the exhaust gas flow being oriented initially parallel to the exhaust gas flow in one region, for example the hotter of the two regions, while, in a second region, the coolant flow is directly counter to the throughflow direction of the exhaust gas flow. The two regions can be selected in an advantageous manner such that the thermal linear expansion of the exhaust gas guiding tubes corresponds to one another in these two regions. This makes it necessary for the first region to be of shorter design because a more rapid cooling is formed in this region than in the other region, with the effect ultimately being achieved by the different overall length that the difference in temperature of the two regions essentially corresponds to each other.

The invention claimed is:

1. A sealing device for exhaust gas heat exchangers, the sealing device being formed between an exhaust-gas-conducting hot component and a cold component which outwardly bounds a cooling device, wherein part of the hot component is guided outward from the cooling device, and with the hot component being held in the cold component in a manner such that the hot component can be displaced longitudinally with axial guidance, the sealing device comprising:
    two sealing elements which are independent of each other, each of the two sealing elements producing a fluidtight connection between the hot component and the cold component, the two sealing elements including a first sealing element and a second sealing element;
    an intermediate ring, the intermediate ring having a recess to accommodate the first sealing element therein; and
    two annular bodies, the second sealing element being positioned, in a fluid-tight manner, between the two annular bodies,
    wherein a first one of the two annular bodies is welded, in a fluid-tight manner, to the intermediate ring, such that the first one of the two annular bodies directly contacts the intermediate ring.

2. A sealing device for exhaust gas heat exchangers, the sealing device being formed between an exhaust-gas-conducting hot component and a cold component which outwardly bounds a cooling device, wherein part of the hot component is guided outward from the cooling device, and with the hot component being held in the cold component in a manner such that the hot component can be displaced longitudinally with axial guidance, the sealing device comprising two sealing elements which are independent of each other, wherein each of the two sealing elements produces a fluidtight connection between the hot component and the cold component,
    wherein an intermediate chamber, which is bounded by the hot component and the cold component and is closed in a fluidtight manner by the two sealing elements, is formed between the two sealing elements, and
    wherein the cold component, in the intermediate chamber between the two sealing elements, has at least one bore passing through the cold component and leading outward, which bore has a thread preferably at least over a partial length.

3. The sealing device as claimed in claim 2, wherein the sealing device has two or three bores which are suitable for the connection of a burst-testing for carrying out a tightness check.

4. The sealing device as claimed in claim 1, wherein the first sealing element is a radial seal.

5. The sealing device as claimed in claim 1, wherein the second sealing element is an axial seal.

6. The sealing device as claimed in claim 1, wherein the first sealing element is an axial seal and the second sealing element is a radial seal, with the axial seal and the radial seal being spaced apart from each other.

7. The sealing device as claimed in claim 5, wherein the axial seal is a bellows seal.

8. The sealing device as claimed in claim 1, further comprising an outer ring, the outer ring being spaced apart from the intermediate ring in an axial direction, and the outer ring directly contacting a second one of the two annular bodies.

9. A sealing device for exhaust gas heat exchangers, the sealing device being formed between an exhaust-gas-conducting hot component and a cold component which outwardly bounds a cooling device, wherein part of the hot component is guided outward from the cooling device, and with the hot component being held in the cold component in a manner such that the hot component can be displaced longitudinally with axial guidance, the sealing device comprising two sealing elements which are independent of each other, wherein each of the two sealing elements produces a fluidtight connection between the hot component and the cold component, and wherein an intermediate chamber, provided between the two sealing elements, has at least one bore passing through the cold component and leading outward.

* * * * *